US012798991B2

(12) United States Patent
Li et al.

(10) Patent No.: US 12,798,991 B2

(45) Date of Patent: Nov. 17, 2026

(54) PRECURSOR WITH TRANSFORMED CRYSTAL FORM AND PREPARATION METHOD THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Bin Li, Foshan (CN); Changdong Li, Foshan (CN); Xinghua Lu, Foshan (CN); Weijian Liu, Foshan (CN); Yong Cai, Foshan (CN); Dingshan Ruan, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 620 days.

(21) Appl. No.: 18/238,525

(22) Filed: Aug. 28, 2023

(65) Prior Publication Data

US 2023/0399238 A1 Dec. 14, 2023

Related U.S. Application Data

(63) Continuation of application No. PCT/CN2022/093079, filed on May 16, 2022.

(30) Foreign Application Priority Data

Aug. 27, 2021 (CN) ......................... 202110994263.9

(51) Int. Cl.

*C01G 51/00* (2025.01)
*B01J 23/00* (2006.01)

(Continued)

(52) U.S. Cl.

CPC .......... *C01G 51/04* (2013.01); *C01P 2004/32* (2013.01); *C01P 2004/61* (2013.01)

(58) Field of Classification Search

CPC ........ C01G 51/04; C01G 51/06; C01G 51/42; C01G 51/00; C01P 2004/32;

(Continued)

(56) References Cited

U.S. PATENT DOCUMENTS 7,452,844 B2 * 11/2008 Hu ........................... B01J 23/75 502/313

7,655,593 B2 * 2/2010 Lok .......................... B01J 23/75 502/247

(Continued)

FOREIGN PATENT DOCUMENTS

CN 107540024 A 1/2018

OTHER PUBLICATIONS

International Search Report of PCT Patent Application No. PCT/CN2022/093079 issued on Aug. 17, 2022.

*Primary Examiner* — Cam N. Nguyen

(74) *Attorney, Agent, or Firm* — Westbridge IP LLC

(57) ABSTRACT

The disclosure discloses a precursor with a transformed crystal form and a preparation method thereof. The preparation method includes: (1) heating a carbonate solution, a cobalt salt to allow a reaction, and spray adding a carbonate solution to allow a reaction to obtain a cobalt carbonate slurry; (2) allowing the slurry to stand, spray adding a cobalt salt and a carbonate solution, and spray adding a cobalt salt using a single spray head at a flow rate of 1 $m^3/h$ to 3 $m^3/h$ and a carbonate solution using no less than three spray heads (Continued)

each at a flow rate of 0.2 $m^3/h$ to 5 $m^3/h$ to obtain cobalt carbonate with a transformed crystal form; and (3) further spray adding a cobalt salt and a carbonate solution to the cobalt carbonate with a transformed crystal form, heating to allow a constant-temperature reaction, and washing and calcining a product.

7 Claims, 3 Drawing Sheets

(51) Int. Cl.

| | |
|---|---|
| ***B01J 23/75*** | (2006.01) |
| ***B01J 37/00*** | (2006.01) |
| ***C01G 51/04*** | (2025.01) |
| ***C01G 51/06*** | (2006.01) |
| ***C01G 51/42*** | (2025.01) |
| ***H01M 4/525*** | (2010.01) |

(58) Field of Classification Search
CPC .............. C01P 2004/61; C01P 2004/03; C01P 2004/16; C01P 2004/24; C01P 2006/11; H01M 4/525; H01M 2004/028; Y02E 60/10; B01J 23/00; B01J 23/75; B01J 37/00
USPC ...................................... 423/594.19; 502/327
See application file for complete search history.

(56) References Cited

U.S. PATENT DOCUMENTS

| | | | | |
|---|---|---|---|---|
| 8,969,231 | B2 * | 3/2015 | Rytter | B01J 23/8896 502/55 |
| 10,892,484 | B2 * | 1/2021 | Park | H01M 10/0525 |
| 11,038,169 | B2 * | 6/2021 | Park | H01M 4/525 |
| 11,189,832 | B2 * | 11/2021 | Kim | H01M 4/525 |
| 11,482,704 | B2 * | 10/2022 | Park | H01M 10/0525 |

* cited by examiner

PRECURSOR WITH TRANSFORMED CRYSTAL FORM AND PREPARATION METHOD THEREOF

CROSS-REFERENCE TO RELATED APPLICATIONS

The present application is a continuation application of PCT application No. PCT/CN2022/093079 filed on May 16, 2022, which claims the benefit of Chinese Patent Application No. 202110994263.9 filed on Aug. 27, 2021. The contents of all of the aforementioned applications are incorporated by reference herein in their entirety.

TECHNICAL FIELD

The present disclosure belongs to the technical field of battery materials, and specifically relates to a precursor with a transformed crystal form and a preparation method thereof.

BACKGROUND

Cobaltosic oxide is an important precursor for lithium cobalt oxide (LCO) cathode materials, and thus the properties of cobaltosic oxide largely determine the performance of an LCO cathode material. Cobalt carbonate is a raw material for cobaltosic oxide, and thus a crystal form of cobalt carbonate affects the properties of cobaltosic oxide.

After cobalt carbonate is calcined into cobaltosic oxide, a particle size is usually reduced. At present, a cobaltosic oxide material obtained by calcining cobalt carbonate with a particle size D50 of 13 μm to 15 μm generally has a particle size D50 of 11 μm to 12 μm, and cobaltosic oxide of this particle size range can be used for high-power battery materials; and a cobaltosic oxide material obtained by calcining cobalt carbonate with a particle size D50 of 17 μm to 18 μm generally has a particle size D50 of 15 μm to 16 μm, and cobaltosic oxide of this particle size range can be used for highly-compacted battery materials. With the development of electronic devices, advanced requirements have been presented on an energy density of an LCO cathode material. Increasing a particle size of a large-particle precursor can increase a compacted density and thus indirectly improve an energy density.

With the increase of a particle size, cobalt carbonate particles are easy to crack and smash during a calcination process, which will affect the consistency and physical and chemical properties of a product. At present, a multi-phase calcination scheme including low-temperature calcination and high-temperature calcination is usually used in the industry to suppress particle cracking. However, the multi-phase calcination affects the equipment utilization and increase a production cost.

SUMMARY OF THE INVENTION

The present disclosure is intended to solve at least one of the technical problems existing in the prior art. In view of this, the present disclosure provides a preparation method and use of cobaltosic oxide (a precursor with a transformed crystal form). Prepared cobalt carbonate can be prepared into cobaltosic oxide through one-step calcination, which solves the problem that cobalt carbonate is easy to crack and smash when calcined into cobaltosic oxide.

To achieve the above objective, the present disclosure adopts the following technical solutions:

A preparation method of cobaltosic oxide is provided, including the following steps:

(1) heating a 0.8 mol/L to 1.8 mol/L carbonate solution, spray adding a cobalt salt and reacting, and then spray adding a 2.5 mol/L to 3.5 mol/L carbonate solution and reacting to obtain a cobalt carbonate slurry with a particle size of 3 μm to 5 μm;

(2) allowing the cobalt carbonate slurry to stand, and spray adding a cobalt salt and a 2.5 mol/L to 3.5 mol/L carbonate solution to allow a reaction to obtain a cobalt carbonate slurry with a particle size of 9 μm to 13 μm; and then spray adding a cobalt salt using a single spray head at a flow rate of 1 $m^3/h$ to 3 $m^3/h$ and spray adding a 2.5 mol/L to 3.5 mol/L carbonate solution using no less than three spray heads each at a flow rate of 0.2 $m^3/h$ to 5 $m^3/h$ to obtain cobalt carbonate with a transformed crystal form; and (3) further spray adding a cobalt salt and a 2.5 mol/L to 3.5 mol/L carbonate solution to the cobalt carbonate with a transformed crystal form, performing a constant-temperature reaction under heating, and washing and calcining a resulting product to obtain the cobaltosic oxide.

Preferably, in step (1), the carbonate solution may be at least one from the group consisting of an ammonium bicarbonate solution, a sodium carbonate solution, a sodium bicarbonate solution, and a potassium bicarbonate solution.

Preferably, in step (1), the cobalt salt may be one from the group consisting of cobalt sulfate and cobalt chloride.

Preferably, in step (1), the cobalt salt may have a molar concentration of 2.5 mol/L to 3.5 mol/L.

Preferably, in step (1), the heating may be conducted at 30° C. to 50° C.

Preferably, in step (1), a pH may be controlled at 7.45 to 7.65 during the reaction.

Preferably, before spray adding the cobalt salt and the 2.5 mol/L to 3.5 mol/L carbonate solution and reacting, step (2) may further include: removing a supernatant from the slurry after the standing.

Preferably, step (2) may further include: allowing a cobalt carbonate slurry obtained after the reaction to stand, removing a resulting supernatant, and spraying the cobalt salt and the 2.5 mol/L to 3.5 mol/L carbonate solution to allow a reaction; and repeating the above process multiple times until obtaining the cobalt carbonate slurry with a particle size of 9 μm to 13 μm.

Preferably, in steps (1) and (2), the cobalt salt may be spray added at a flow rate of 1 $m^3/h$ to 3 $m^3/h$.

Preferably, in steps (1) and (2), the 2.5 mol/L to 3.5 mol/L carbonate solution may be spray added at a flow rate of 0.2 $m^3/h$ to 5 $m^3/h$.

Preferably, in step (2), the cobalt salt may be spray added using a single spray head at a flow rate of 1 $m^3/h$ to 3 $m^3/h$ and the 2.5 mol/L to 3.5 mol/L carbonate solution may be sprayed using no less than three spray heads each at a flow rate of 0.2 $m^3/h$ to 5 $m^3/h$, which is intended to change a contact area between the cobalt salt and the 2.5 mol/L to 3.5 mol/L carbonate solution.

Preferably, in step (2), a pH may be controlled at 7.3 to 7.6 when the contact area between the cobalt salt and the 2.5 mol/L to 3.5 mol/L carbonate solution is changed.

Preferably, in step (2), the obtained cobalt carbonate slurry with a particle size of 9 μm to 13 μm may be dispensed into 2 to 5 parts; and to one of the dispensed parts, the cobalt salt may be sprayed using a single spray head at a flow rate of 1 $m^3/h$ to 3 $m^3/h$ and the 2.5 mol/L to 3.5 mol/L carbonate solution may be spray added using no less than three spray heads each at a flow rate of 0.2 $m^3/h$ to 5 $m^3/h$.

Preferably, before the constant-temperature reaction, step (3) may further include adding a complexing agent.

Further preferably, the complexing agent may be citric acid.

Preferably, in step (3), the constant-temperature reaction may be conducted at 50° C. to 60° C. for 5 h to 10 h.

Preferably, in step (3), when the cobalt salt and the 2.5 mol/L to 3.5 mol/L carbonate solution are further spray added to the cobalt carbonate with a transformed crystal form, the cobalt salt may be spray added at a flow rate of 1 $m^3/h$ to 3 $m^3/h$, and the 2.5 mol/L to 3.5 mol/L carbonate solution may be spray added at a flow rate of 0.2 $m^3/h$ to 5 $m^3/h$.

Preferably, step (3) may further include: allowing a cobalt carbonate slurry obtained after the constant-temperature reaction to stand, removing a resulting supernatant, and spray adding the cobalt salt and the 2.5 mol/L to 3.5 mol/L carbonate solution; repeating the above process multiple times until a solid content in the cobalt carbonate slurry reaches 400 g/L to 580 g/L; and dispensing the cobalt carbonate slurry, and further spray adding the cobalt salt and the 2.5 mol/L to 3.5 mol/L carbonate solution to obtain spherical cobalt carbonate with a particle size of 14.5 μm to 22 μm.

Preferably, in step (3), spherical cobalt carbonate obtained after the washing may have a median particle size Dv50 of 16 μm to 22 μm and a tap density (TD) of 1.85 $g/cm^3$ to 2.15 $g/cm^3$.

More preferably, the spherical cobalt carbonate may be formed as follows: with micron-sized cobalt carbonate crystal grains as primary particles, crystal transformation is conducted to make the primary particles grow into long columnar and platy single crystal particles, and then the primary particles grow and accumulate regularly along the surface of spherical secondary particles to form cobalt carbonate particles with a transformed crystal form, where there are many voids among the primary particles.

Preferably, in step (3), the calcining may be conducted at 700° C. to 770° C. for 5 h to 10 h.

Preferably, in step (3), the calcining may be conducted in an air or oxygen atmosphere.

Cobaltosic oxide prepared by the above preparation method is also provided, where the cobaltosic oxide has a median particle size Dv50 of 14.5 μm to 20 μm.

The present disclosure also provides use of cobaltosic oxide prepared by the above preparation method in the preparation of an LCO cathode material.

Principle of morphology control for primary whiskers:

Primary whiskers are achieved by controlling a contact rate of the cobalt salt with the 2.5 mol/L to 3.5 mol/L carbonate solution. The feeding rates and the number of spray heads for the cobalt salt and the 2.5 mol/L to 3.5 mol/L carbonate solution are adjusted to control the contact between the two liquids and a concentration difference is adjusted in a small range to control a growth direction of crystal grains, thereby regulating the morphology. (Notes: In addition to feeding rates, a contact area per unit time is crucial. With a single spray head, a high rate cannot achieve the effect, because high local uniformity cannot be achieved in a short time. Multiple spray heads can lead to a large contact area per unit time, and thus can achieve high uniformity in a short time.)

Principle of generation of voids during crystal transformation:

Particles are densely stacked inside cobalt carbonate, and crystal transformation and growth are achieved on the basis of the internal particles, such that the external transformed part is flaky or columnar and voids among primary particles increase. The formation of voids in the crystal transformation is caused by the change of a growth direction of external crystal grains of cobalt carbonate. When a reaction environment is changed (for example, a contact area per unit time of the cobalt salt with the 2.5 mol/L to 3.5 mol/L carbonate solution increases), crystal grains preferentially grow along a specified crystal plane, such that the morphology of a material changes from granular to flaky and columnar and voids among external particles increase. When the cobalt carbonate is calcined into cobaltosic oxide, the presence of the voids alleviates the stress accumulation caused by volume deformation during the calcination process, which solves the problem that conventional large and medium-particle cobalt carbonate is easy to crack and break when calcined into cobaltosic oxide.

Compared with the prior art, the present disclosure has the following beneficial effects.

1. In the present disclosure, a cobalt carbonate crystal nucleus is first formed using a carbonate and a cobalt salt of different concentrations, and then crystal transformation is conducted on the basis of the crystal nucleus. The cobalt carbonate with a transformed crystal form has a reduced surface reaction energy, such that the cobalt carbonate is easy to grow up and is not prone to small particles. A small number of voids formed during the crystal transformation provide a deformation buffer for the shrinkage of particles undergoing crystal transformation during calcination, thereby improving the processability. The cobalt carbonate with a transformed crystal form can be prepared into spherical cobaltosic oxide through one-step calcination, which solves the problem that conventional large and medium-particle cobalt carbonate is easy to crack and break when calcined into cobaltosic oxide.
2. In the present disclosure, two carbonate solutions with different concentrations are used in the preparation process. The carbonate solution with a low concentration is used as a base solution to reduce a pH change and an initial reaction rate, such that a nucleation rate is lower than a growth rate, thereby ensuring the sphericity and the particle size distribution uniformity. The carbonate solution with a high concentration is used subsequently to increase a growth rate and a production capacity.
3. A spray device for spraying the cobalt salt and the 2.5 mol/L to 3.5 mol/L carbonate solution in the present disclosure has no less than three spray heads. In nucleation, a single spray head is used to spray the cobalt salt and a single spray head is used to spray the 2.5 mol/L to 3.5 mol/L carbonate solution, which is conducive to nucleation. In crystal transformation, a single spray head is used to spray the cobalt salt and multiple spray heads are used to spray the 2.5 mol/L to 3.5 mol/L carbonate solution, which is conducive to the growth of a transformed crystal nucleus. The multi-spraying device can increase a contact area between materials and promote a microreaction to achieve a full reaction of the salt solution with the ammonium bicarbonate solution in a short time, such that the entire reaction system is violent, uniform, and stable, which can prevent the formation of small particles and accelerate a crystal transformation process.

4. In the present disclosure, the cobalt carbonate with a transformed crystal form is used to prepare spherical cobaltosic oxide through one-step calcination, which solves the problem of easy cracking and breaking from the material itself, and a calcination temperature can also be adjusted to make generated cobaltosic oxide uniform.

DETAILED DESCRIPTION OF ILLUSTRATED EXAMPLES

Figure 1:
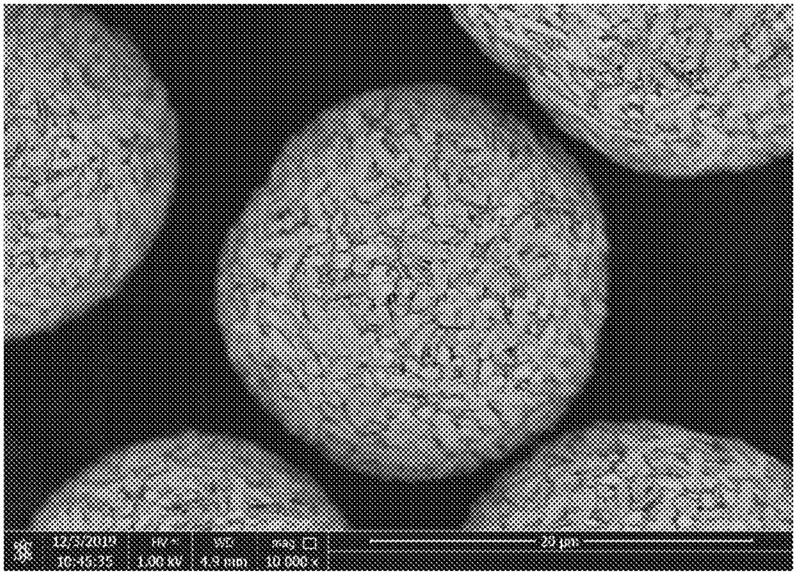
FIG. 1 is a scanning electron microscopy (SEM) image of the cobalt carbonate with a transformed crystal form prepared in Example 1.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A preparation method of cobaltosic oxide was provided in this example, including the following steps:

(1) Preparation of raw materials: Cobalt sulfate was dissolved in deionized water to prepare a cobalt salt solution with a cobalt ion concentration of 120 g/L; ammonium bicarbonate was dissolved in deionized water to prepare a carbonate solution with a concentration of 220 g/L; and ammonium bicarbonate was dissolved in deionized water to prepare a solution C with a concentration of 120 g/L.

(2) Nucleation: 2 $m^3$ of the solution C was added as a base solution to a reactor, heated to 40° C. and kept at the temperature by a circulating water bath, and continuously stirred at 150 rpm; a single spray head was used to spray the cobalt salt solution into the reactor at a flow rate of 1.5 $m^3$/h until a pH in the reactor was reduced to 7.5, and then a single spray head was used to spray the 220 g/L carbonate solution at a flow rate of 2 $m^3$/h, where a pH was stably controlled at 7.5 by adjusting the flow rate of the 220 g/L carbonate solution; and when a particle size of cobalt carbonate reached 3.5 μm, the feeding and the stirring were stopped to obtain a dispersive sample slurry.

(3) Crystal transformation process: The dispersive sample slurry was subjected to static settlement for the first time, and a resulting supernatant was removed; the cobalt salt solution was sprayed with a single spray head at a flow rate of 1.5 $m^3$/h and the 220 g/L carbonate solution was sprayed with a single spray head at a flow rate of 2 $m^3$/h, and after the reactor (10 $m^3$) was filled up with a slurry, the feeding was stopped; then a cycle of "static settlement-supernatant removal-spraying the cobalt salt solution and 3 mol/L carbonate solution with a single spray head-stopping feeding when the reactor was filled up" was repeated until a particle size of a seed crystal reached 10 μm; a seed crystal slurry was dispensed for the first time into two parts; and to one part of the seed crystal slurry, the cobalt salt solution was sprayed with a single spray head at a flow rate of 1.5 $m^3$/h and the 220 g/L carbonate solution was sprayed with three spray heads each at a flow rate of 2 $m^3$/h until a particle size reached 11 μm to complete the crystal transformation for cobalt carbonate, where a pH was stably controlled at 7.3.

(4) Growth: The cobalt salt solution was sprayed with a single spray head at a flow rate of 1.5 $m^3$/h and the 220 g/L carbonate solution was sprayed with three spray heads each at a flow rate of 2 $m^3$/h, where a temperature was controlled at 50° C. and a pH was stably controlled at 7.3; 3 h later, the feeding and the stirring were stopped, a resulting slurry was allowed to stand, and a resulting supernatant was removed; the stirring was started, and the next round of feeding continued; the above feeding was repeated until a solid content in a cobalt carbonate slurry in the reactor reached 450 g/L; the cobalt carbonate slurry was dispensed for the second time, and then the feeding continued with the reaction conditions unchanged; and the above operation was repeated until cobalt carbonate had a target particle size to obtain a slurry of spherical cobalt carbonate with a transformed crystal form.

(5) The slurry of spherical cobalt carbonate with a transformed crystal form was washed for 50 min, dewatered for 20 min, and dried for 6 h to obtain a spherical cobalt carbonate powder with a transformed crystal form, which had a median particle size Dv50 of 18.5 μm and a TD of 1.96 g/$cm^3$.

(6) The dried spherical cobalt carbonate powder with a transformed crystal form was subjected to one-step calcination at 700° C. for 6 h in an air atmosphere to obtain spherical cobaltosic oxide with a median particle size Dv50 of 16.5 μm.

Example 2

A preparation method of cobaltosic oxide was provided in this example, including the following steps:

(1) Preparation of raw materials: Cobalt sulfate was dissolved in deionized water to prepare a cobalt salt solution with a cobalt ion concentration of 150 g/L; ammonium bicarbonate was dissolved in deionized water to prepare a carbonate solution with a concentration of 210 g/L; and ammonium bicarbonate was dissolved in deionized water to prepare a solution C with a concentration of 100 g/L.

(2) Nucleation: 2.5 $m^3$ of the solution C was added as a base solution to a reactor, heated to 40° C. and kept at the temperature by a circulating water bath, and continuously stirred at 150 rpm; a single spray head was used to spray the cobalt salt solution into the reactor at a flow rate of 1.5 $m^3$/h until a pH in the reactor was reduced to 7.5, and then a single spray head was used to spray the 210 g/L carbonate solution at a flow rate of 2 $m^3$/h, where a pH was stably controlled at 7.5 by adjusting the flow rate of the 210 g/L carbonate solution; and when a particle size of cobalt carbonate reached 3.5 μm, the feeding and the stirring were stopped to obtain a dispersive sample slurry.

(3) The dispersive sample slurry in the reactor was subjected to static settlement for the first time, and a resulting supernatant was removed; the cobalt salt solution was sprayed with a single spray head at a flow rate of 1.5 $m^3$/h and the 210 g/L carbonate solution was sprayed with a single spray head at a flow rate of 2 $m^3$/h, and after the reactor (10 $m^3$) was filled up with a slurry, the feeding was stopped; then a cycle of "static settlement-supernatant removal-spraying the cobalt salt solution and 3 mol/L carbonate solution with a single spray head-stopping feeding when the reactor was filled up" was repeated until a particle size of a seed crystal reached 11.5 μm; a seed crystal slurry was dispensed for the first time into two parts; and to one part of the seed crystal slurry, the cobalt salt solution was sprayed with a single spray head at a flow rate of 1.5 $m^3$/h and the 210 g/L carbonate solution was sprayed with four spray heads each at a flow rate of 2 $m^3$/h until a particle size reached 12.5 μm to complete the crystal transformation for cobalt carbonate, where a pH was stably controlled at 7.5.

(4) The cobalt salt solution was sprayed with a single spray head at a flow rate of 1.5 $m^3$/h and the 210 g/L carbonate solution was sprayed with four spray heads each at a flow rate of 2 $m^3$/h, where citric acid (a molar ratio of the 210 g/L carbonate to the citric acid was 100:1.0) was added, a temperature was controlled at 55° C., and a pH was stably controlled at 7.5; 3.5 h later, the feeding and the stirring were stopped, a resulting slurry was allowed to stand, and a resulting supernatant was removed; the stirring was started, and the next round of feeding continued; the above feeding was repeated until a solid content in a cobalt carbonate slurry in the reactor reached 480 g/L; the cobalt carbonate slurry was dispensed for the second time, and then the feeding continued with the reaction conditions unchanged; and the above operation was repeated until cobalt carbonate had a target particle size to obtain a spherical cobalt carbonate slurry.

(5) The spherical cobalt carbonate slurry was washed for 50 min, dewatered for 20 min, and dried for 6 h to obtain a spherical cobalt carbonate powder with a transformed crystal form, which had a median particle size Dv50 of 18.8 μm and a TD of 2.01 g/$cm^3$.

(6) The dried spherical cobalt carbonate powder with a transformed crystal form was subjected to one-step calcination at 750° C. for 6 h in an air atmosphere to obtain spherical cobaltosic oxide with a median particle size Dv50 of 16.8 μm.

Example 3

A preparation method of cobaltosic oxide was provided in this example, including the following steps:

(1) Cobalt sulfate was dissolved in deionized water to prepare a cobalt salt solution with a cobalt ion concentration of 100 g/L; sodium bicarbonate was dissolved in deionized water to prepare a carbonate solution with a concentration of 230 g/L; and sodium bicarbonate was dissolved in deionized water to prepare a solution C with a concentration of 80 g/L.

(2) 1.8 $m^3$ of the solution C was added as a base solution to a reactor, heated to 45° C. and kept at the temperature by a circulating water bath, and continuously stirred at 150 rpm; a single spray head was used to spray the cobalt salt solution into the reactor at a flow rate of 3 $m^3$/h until a pH in the reactor was reduced to 7.5, and then a single spray head was used to spray the 230 g/L carbonate solution at a flow rate of 4 $m^3$/h, where a pH was stably controlled at 7.5 by adjusting the flow rate of the 230 g/L carbonate solution; and when a particle size of cobalt carbonate reached 5.5 μm, the feeding and the stirring were stopped to obtain a dispersive sample slurry.

(3) The dispersive sample slurry was subjected to static settlement for the first time, and a resulting supernatant was removed; the cobalt salt solution was sprayed with a single spray head at a flow rate of 3 $m^3$/h and the 230 g/L carbonate solution was sprayed with a single spray head at a flow rate of 4 $m^3$/h, and after the reactor was filled up with a slurry, the feeding was stopped; then a cycle of "static settlement-supernatant removal-spraying the cobalt salt solution and 230 g/L carbonate solution with a single spray head-stopping feeding when the reactor was filled up" was repeated until a particle size of a seed crystal reached 11.5 μm; a seed crystal slurry was dispensed for the first time into two parts; and to one part of the seed crystal slurry, the cobalt salt solution was sprayed with a single spray head at a flow rate of 3 $m^3$/h and the 230 g/L carbonate solution was sprayed with four spray heads each at a flow rate of 4 $m^3$/h until a particle size reached 12.5 μm to complete the crystal transformation for cobalt carbonate, where a pH was stably controlled at 7.5.

(4) The cobalt salt solution was sprayed with a single spray head at a flow rate of 3 $m^3$/h and the 230 g/L carbonate solution was sprayed with four spray heads each at a flow rate of 4 $m^3$/h, where a temperature was controlled at 56° C. and a pH was stably controlled at 7.5; 4.0 h later, the feeding and the stirring were stopped, a resulting slurry was allowed to stand, and a resulting supernatant was removed; the stirring was started, and the next round of feeding continued; the above feeding was repeated until a solid content in a cobalt carbonate slurry in the reactor reached 460 g/L; the cobalt carbonate slurry was dispensed for the second time, and then the feeding continued with the reaction conditions unchanged; and the above operation was repeated until cobalt carbonate had a target particle size to obtain a spherical cobalt carbonate slurry.

(5) The spherical cobalt carbonate slurry was washed for 70 min, dewatered for 25 min, and dried for 10 h to obtain a spherical cobalt carbonate powder, which had a median particle size Dv50 of 19.8 μm and a TD of 2.11 g/$cm^3$.

(6) The dried spherical cobalt carbonate powder was subjected to one-step calcination at 750° C. for 5 h in an air atmosphere to obtain spherical cobaltosic oxide with a median particle size Dv50 of 17.8 μm.

Example 4

A preparation method of cobaltosic oxide was provided in this example, including the following steps:

The preparation method was basically the same as that in Example 1 except that, before the static settlement for the first time in step (3), a particle size reached 4.5 μm; a particle size reached 13 μm after the crystal transformation was completed; citric acid was added during crystal transformation; a spherical cobalt carbonate powder obtained after the drying had a median particle size D50 of 21 μm and a TD of 2.23 g/cm$^3$; the one-step calcination was conducted at 760° C. for 6 h; and obtained spherical cobaltosic oxide had a median particle size Dv50 of 18.5 μm.

Example 5

A preparation method of cobaltosic oxide was provided in this example, including the following steps:

The preparation method was basically the same as that in Example 2 except that, before the static settlement for the first time in step (3), a particle size reached 4.2 μm; a particle size reached 11 μm after the crystal transformation was completed; citric acid was not added during crystal transformation; a spherical cobalt carbonate powder obtained after the drying had a median particle size D50 of 16 μm and a TD of 1.89 g/cm$^3$; the one-step calcination was conducted at 680° C. for 6 h; and obtained spherical cobaltosic oxide had a median particle size Dv50 of 14.7 μm.

Comparative Example 1

A preparation method of cobaltosic oxide was provided in this comparative example, including the following steps:

(1) Cobalt sulfate was dissolved in deionized water to prepare a cobalt salt solution with a cobalt ion concentration of 120 g/L; ammonium bicarbonate was dissolved in deionized water to prepare a carbonate solution with a concentration of 220 g/L; and ammonium bicarbonate was dissolved in deionized water to prepare a solution C with a concentration of 120 g/L.

(2) 2 m$^3$ of the solution C was added as a base solution to a reactor, heated to 40° C. and kept at the temperature by a circulating water bath, and continuously stirred at 150 rpm; a single spray head was used to spray the cobalt salt solution into the reactor at a flow rate of 1.5 m$^3$/h until a pH in the reactor was reduced to 7.5, and then a single spray head was used to spray the 220 g/L carbonate solution at a flow rate of 2 m$^3$/h, where a pH was stably controlled at 7.5 by adjusting the flow rate of the 220 g/L carbonate solution; and when a particle size of cobalt carbonate reached 3.5 μm, the feeding and the stirring were stopped to obtain a dispersive sample slurry.

(3) The dispersive sample slurry in the reactor was subjected to static settlement for the first time, and a resulting supernatant was removed; the cobalt salt solution was sprayed with a single spray head at a flow rate of 1.5 m$^3$/h and the 220 g/L carbonate solution was sprayed with a single spray head at a flow rate of 2 m$^3$/h, and after the reactor was filled up with a slurry, the feeding was stopped; then a cycle of "static settlement-supernatant removal-spraying the cobalt salt solution and 220 g/L carbonate solution with a single spray head-stopping feeding when the reactor was filled up" was repeated until a particle size of a seed crystal reached 10 μm; a seed crystal slurry was dispensed for the first time, the cobalt salt solution was sprayed with a single spray head at a flow rate of 1.5 m$^3$/h and the 220 g/L carbonate solution was sprayed with a single spray head at a flow rate of 2 m$^3$/h until a particle size reached 11 μm, where a pH was stably controlled at 7.3.

(4) The cobalt salt solution was sprayed with a single spray head at a flow rate of 1.5 m$^3$/h and the 220 g/L carbonate solution was sprayed with a single spray head at a flow rate of 2 m$^3$/h, where a temperature was controlled at 50° C. and a pH was stably controlled at 7.3; 3 h later, the feeding and the stirring were stopped, a resulting slurry was allowed to stand, and a resulting supernatant was removed; the stirring was started, and the next round of feeding continued; the above feeding was repeated until a solid content in a cobalt carbonate slurry in the reactor reached 450 g/L; the cobalt carbonate slurry was dispensed for the second time, and then the feeding continued with the reaction conditions unchanged; and the above operation was repeated until cobalt carbonate had a target particle size to obtain a spherical cobalt carbonate slurry.

(5) The spherical cobalt carbonate slurry was washed for 50 min, dewatered for 20 min, and dried for 6 h to obtain a spherical cobalt carbonate powder, which had a median particle size D50 of 18.2 μm and a TD of 1.98 g/cm$^3$.

(6) The dried spherical cobalt carbonate powder was subjected to one-step calcination at 700° C. for 6 h in an air atmosphere to obtain spherical cobaltosic oxide, where the cobalt tetraoxide partially cracked and had a median particle size Dv50 of 16.2 μm.

Comparative Example 2

A preparation method of cobaltosic oxide was provided in this comparative example, including the following steps:

(1) Cobalt sulfate was dissolved in deionized water to prepare a cobalt salt solution with a cobalt ion concentration of 120 g/L; ammonium bicarbonate was dissolved in deionized water to prepare a carbonate solution with a concentration of 220 g/L; and ammonium bicarbonate was dissolved in deionized water to prepare a solution C with a concentration of 120 g/L.

(2) 2 m$^3$ of the solution C was added as a base solution to a reactor, heated to 40° C. and kept at the temperature by a circulating water bath, and continuously stirred at 150 rpm; a single spray head was used to spray the cobalt salt solution into the reactor at a flow rate of 1.5 m$^3$/h until a pH in the reactor was reduced to 7.6, and then a single spray head was used to spray the 220 g/L carbonate solution at a flow rate of 2 m$^3$/h, where a pH was stably controlled at 7.6 by adjusting the flow rate of the 220 g/L carbonate solution; and when a particle size of cobalt carbonate reached 3.5 μm, the feeding and the stirring were stopped to obtain a dispersive sample slurry.

(3) The dispersive sample slurry in the reactor was subjected to static settlement for the first time, and a resulting supernatant was removed; the cobalt salt solution was sprayed with a single spray head at a flow rate of 1.5 m$^3$/h and the 220 g/L carbonate solution was sprayed with a single spray head at a flow rate of 2 m$^3$/h, and after the reactor (10 m$^3$) was filled up with a slurry, the feeding was stopped; then a cycle of "static settlement-supernatant removal-spraying the cobalt salt solution and 220 g/L carbonate solution with a single spray head-stopping feeding when the reactor was filled up" was repeated until a particle size of a seed crystal reached 10 μm; a seed crystal slurry was dispensed for the first time, the cobalt salt solution was sprayed with a single spray head at a flow rate of 1.5 m$^3$/h and the 220 g/L carbonate solution was sprayed with a single spray head at a flow rate of 2 m$^3$/h until a particle size reached 11 μm, where a pH was stably controlled at 7.0.

(4) The cobalt salt solution was further sprayed with a single spray head and the 3 mol/L carbonate solution was further sprayed with a single spray head, where a temperature was controlled at 50° C. and a pH was stably controlled at 7.0; 3 h later, the feeding and the stirring were stopped, a resulting slurry was allowed to stand, and a resulting supernatant was removed; the stirring was started, and the next round of feeding continued; the above feeding was repeated until a solid content in a cobalt carbonate slurry in the reactor reached 450 g/L; the cobalt carbonate slurry was dispensed for the second time, and then the feeding continued with the reaction conditions unchanged; and the above operation was repeated until cobalt carbonate had a target particle size to obtain a spherical cobalt carbonate slurry.

(5) The spherical cobalt carbonate slurry was washed for 50 min, dewatered for 20 min, and dried for 6 h to obtain a spherical cobalt carbonate powder with small particles, which had a median particle size Dv50 of 17.6 μm and a TD of 1.90 g/cm$^3$.

(6) The dried spherical cobalt carbonate powder was subjected to one-step calcination at 700° C. for 6 h in an air atmosphere to obtain spherical cobaltosic oxide, where the cobalt tetraoxide partially cracked, included small particles, and had a median particle size Dv50 of 15.1 μm.

Figure 2:
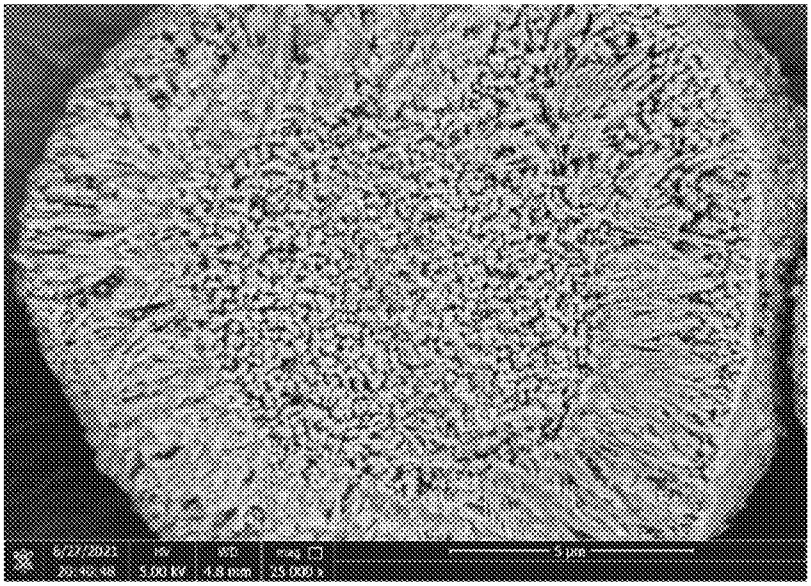
FIG. 2 is a cross-sectional view of the cobaltosic oxide prepared by calcining cobalt carbonate with a transformed crystal form in Example 1.
Figure 3:
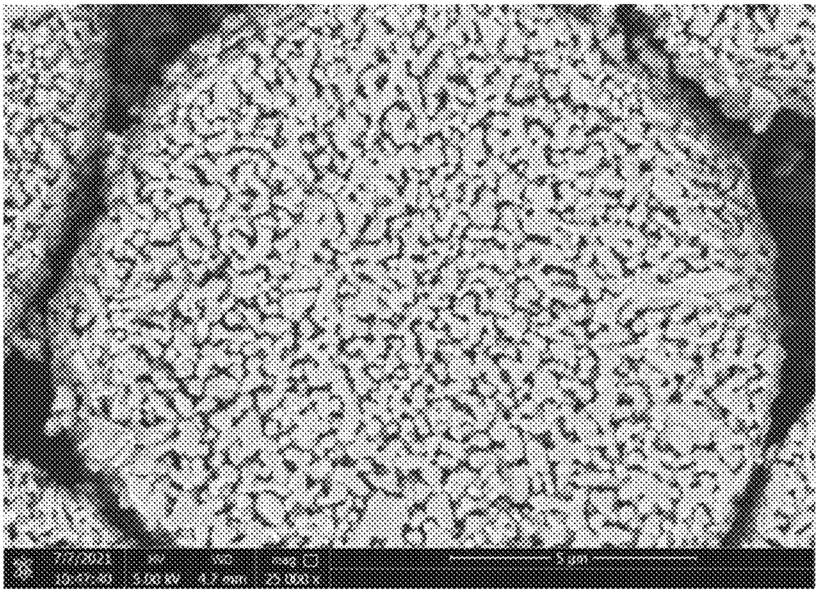
FIG. 3 is a cross-sectional view of the cobaltosic oxide prepared by calcining cobalt carbonate with a transformed crystal form in Example 2.
Figure 4:
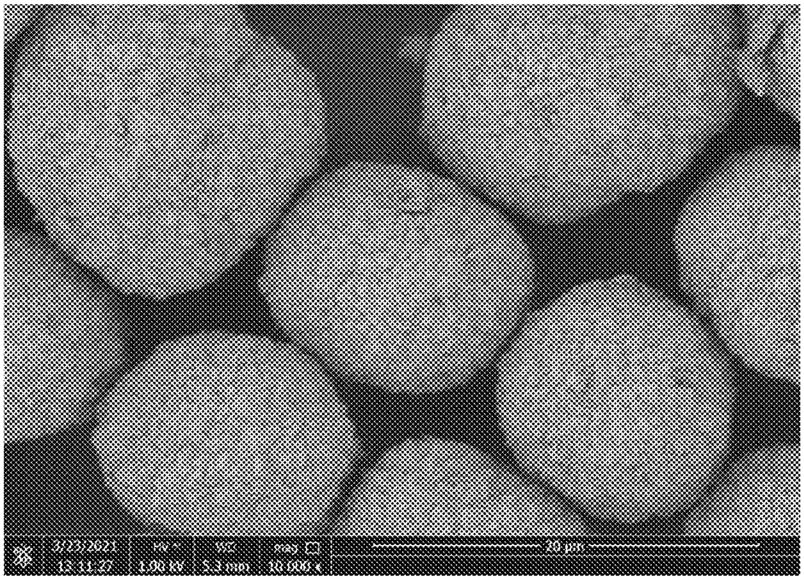
FIG. 4 is an SEM image of the cobalt carbonate with a non-transformed crystal form in Comparative Example 1.
Figure 5:
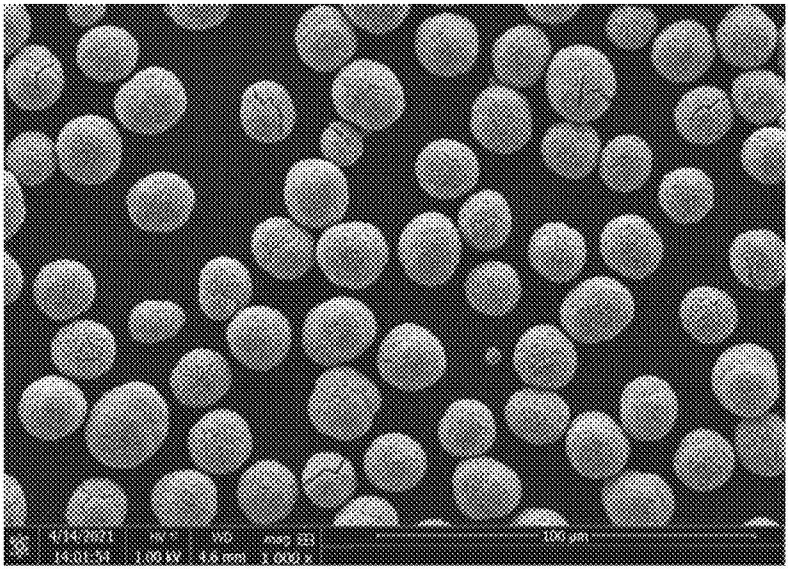
FIG. 5 is an SEM image of the cobaltosic oxide prepared by calcining cobalt carbonate with a non-transformed crystal form in Comparative Example 1.

There is a sheet-like morphology on the surface of cobalt carbonate particles of Example 1 (FIG. 1). It can be seen from the cross-sectional view (FIG. 2) of the cobaltosic oxide obtained after calcination that there are significant differences between the internal and the external of a particle, with an obvious boundary line, which is caused by crystal transformation. A calcination temperature for preparing the cobaltosic oxide can be adjusted to make the boundary line disappear, as shown in FIG. 3. FIG. 4 is an SEM image of the cobalt carbonate with a non-transformed crystal form in Comparative Example 1, and it can be seen that there are bulges on the surface and there is no sheet-like morphology. As shown in FIG. 5, the cobaltosic oxide obtained by calcining the cobalt carbonate with a non-transformed crystal form has obvious cracks due to stress accumulation, resulting in poor product consistency.

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A method for preparation of cobaltosic oxide, comprising the following steps:

(1) heating a 0.8 mol/L to 1.8 mol/L carbonate solution, spray adding a cobalt salt and reacting, and spray adding a 2.5 mol/L to 3.5 mol/L carbonate solution and reacting to obtain a cobalt carbonate slurry with a particle size of 3 μm to 5 μm;

(2) allowing the cobalt carbonate slurry to stand, and spray adding a cobalt salt and a 2.5 mol/L to 3.5 mol/L carbonate solution separately to allow a reaction to obtain a cobalt carbonate slurry with a particle size of 9 μm to 13 μm; and spray adding a cobalt salt using a single spray head at a flow rate of 1 m$^3$/h to 3 m$^3$/h and spray adding a 2.5 mol/L to 3.5 mol/L carbonate solution using no less than three spray heads each at a flow rate of 0.2 m$^3$/h to 5 m$^3$/h to obtain cobalt carbonate with a transformed crystal form; and (3) further spray adding a cobalt salt and a 2.5 mol/L to 3.5 mol/L carbonate solution to the cobalt carbonate with a transformed crystal form, performing a constant-temperature reaction under heating, and washing and calcining a resulting product to obtain the cobaltosic oxide, wherein in steps (1) and (2), the cobalt salt is spray added at a flow rate of 1 m$^3$/h to 3 m$^3$/h, and the 2.5 mol/L to 3.5 mol/L carbonate solution is spray added at a flow rate of 0.2 m$^3$/h to 5 m$^3$/h.

2. The method for preparation according to claim 1, wherein in step (1), the carbonate solution is at least one selected from the group consisting of an ammonium bicarbonate solution, a sodium carbonate solution, a sodium bicarbonate solution, and a potassium bicarbonate solution.

3. The method for preparation according to claim 1, wherein in step (1), the cobalt salt is one selected from the group consisting of cobalt sulfate and cobalt chloride.

4. The method for preparation according to claim 1, wherein in step (1), a pH is controlled at 7.45 to 7.65 during the reaction.

5. The method for preparation according to claim 1, wherein step (2) further comprises: allowing the cobalt carbonate slurry obtained after the reaction to stand, removing a resulting supernatant, and spray adding the cobalt salt and the 2.5 mol/L to 3.5 mol/L carbonate solution to allow a reaction; and repeating the above process multiple times until the cobalt carbonate slurry with a particle size of 9 μm to 13 μm is obtained.

6. The method for preparation according to claim 1, wherein step (3) further comprises: allowing a cobalt carbonate slurry obtained after the constant-temperature reaction to stand, removing a resulting supernatant, and spray adding the cobalt salt and the 2.5 mol/L to 3.5 mol/L carbonate solution; repeating the above process multiple times until a solid content in the cobalt carbonate slurry reaches 400 g/L to 580 g/L; and dispensing the cobalt carbonate slurry, and further spray adding the cobalt salt and the 2.5 mol/L to 3.5 mol/L carbonate solution to obtain spherical cobalt carbonate with a particle size of 14.5 μm to 22 μm.

7. The method for preparation according to claim 1, wherein in step (3), the calcining is conducted at 700° C. to 770° C. for 5 h to 10 h.

* * * * *